United States Patent [19]

Gournay

[11] 4,435,977
[45] Mar. 13, 1984

[54] METHOD FOR LOCATING LOW RESISTIVITY PAY SANDS USING WELL LOGS

[75] Inventor: Luke S. Gournay, Rockwall, Tex.

[73] Assignee: Mobil Oil Corporation, New York, N.Y.

[21] Appl. No.: 339,963

[22] Filed: Jan. 18, 1982

[51] Int. Cl.³ .............................................. E21B 49/00
[52] U.S. Cl. ........................................ 73/152; 364/422
[58] Field of Search ........................... 73/152; 364/422

[56] References Cited

U.S. PATENT DOCUMENTS 4,369,497  1/1983  Poupon et al. ........................ 73/152

OTHER PUBLICATIONS

Murphy and Owens "A New Approach for Low-Resistivity Sand Log Analysis", Journal of Petroleum Technology, pp. 1302-1306, Nov. 1972.

Log Interpretation, vol. I-Principles, Schlumberger Ltd., pp. 104 and 37-41 (1972 Edit.).

Vajnar et al. "Surprising Productivity from Low Resistivity Sands" 18th Annual Logging Symposium Transactions, Society of Professional Well Logging Analysts (SPWLA), Jun. 5-8, 1977.

Gauntt et al. "The Use of Core Analysis Data to Explain the Abnormally Low Resistivities of Some Hydrocarbon-Productive Simpson Series Sand in Central Oklahoma", 4th Annual Logging Symposium Transactions, SPWLA, May 23-24, 1963.

Timur "An Investigation of Permeability, Porosity & Residual Water Saturation Relationships for Sandstone Reservoirs", The Log Analyst, pp. 8-17, Jul.-Aug. 1968.

Primary Examiner—Howard A. Birmiel
Attorney, Agent, or Firm—A. J. McKillop; M. G. Gilman; J. F. Powers, Jr.

[57] ABSTRACT

A method of identifying potential low water cut hydrocarbon producing zones in a sand or sandstone formation by logging the formation to determine its permeability and porosity values and generating from said two sets of values a log of specific surface areas of the formation. The aforesaid zones may be identified directly from the specific surface area log as being those regions in which the specific surface areas are about 500 m²/cm³ bulk volume or more. Alternatively or additionally, the specific surface area log may be used to determine irreducible water saturation values of the formation which can then be compared with fractional water saturation values. The aforesaid zones are those in which the irreducible water saturation values approximate or exceed the fractional water saturation values.

13 Claims, 3 Drawing Figures

METHOD FOR LOCATING LOW RESISTIVITY PAY SANDS USING WELL LOGS

BACKGROUND OF THE INVENTION

The invention relates to oil and natural gas exploration and in particular to methods of locating potential low water cut oil and gas reservoirs in sand formations having significant water saturations.

Low resistivity pay sands are subsurface sand or sandstone formations which indicate low formation resistivity when logged with conventional equipment, implying the presence of a significant amount of water, but produce water-free or relatively low water cut oil or natural gas (i.e. "pay") when tapped. Such sands are located in the Gulf of Mexico and other areas. See for example, E. A. Vajnar, et al "Surprising Productivity from Low Resistivity Sands", 18th Annual Logging Symposium Transactions, Society of Professional Well Logging Analysts, June 5-8, 1977, Houston Tex.; and J. C. Gauntt et al "The Use of Core Analysis Data to Explain the Abnormally Low Resistivities of Some Hydrocarbon-Productive Simpson Series Sand in Central Oklahoma", 4th Annual Logging Symposium Transactions, Society of Professional Well Logging Analysists, May 23-24, 1963, Oklahoma City, Okla. discussing this phenomena. Hereinafter "sand" will be used generically to refer to both consolidated and unconsolidated subsurface geological formations of that material. Also "log" will refer to the signals generated by an appropriate logging tool while traversing the formation, which signals represent measurements of one or more of its varying characteristics as a function of depth, as well as to any temporary record like a CRT display or permanent record like a strip chart, magnetic tape or other computer file of such characteristics or of other varying characteristics derived from the measurements. The log may have values for a continuous range of depths or for a series of discrete depths.

Several methods have been proposed to identify low resistivity pay sands. Basically all involve determining the bound water saturation of the formation from laboratory measurements of samples of the formation material and comparing that to the fractional water saturation determined from the logs. The latter is the total water saturation, bound and free, of the formation expressed as a percent of its pore space. If the former is about equal to or exceeds the latter, it is likely that the water in the formation is bound whereas if the latter exceeds the former, free water exists which will be produced if the formation is tapped at that location. Alternatively, the bound water saturation may be used to determine a so-called "Productive Resistivity" corresponding to that of a low water cut hydrocarbon reservoir which is then compared directly with the formation resistivity log data. This method is described in the aforesaid Gauntt et al article. Gathering and analyzing formation samples is both time consuming and expensive.

The number of samples needed to determine irreducible water saturation of a formation is reduced in some methods by empirically relating the bound or irreducible water saturation measured from a small group of representative formation samples to a characteristic of the formation which can be measured with or determined from conventional logging tools. These methods are based upon the widely held view that bound water saturations are related in some manner to such characteristics of the formation as its porosity, permeability and/or specific surface area (i.e. surface area per quantity of the formation material). Some of these relationships are summarized by A. Timur in an article entitled "An Investigation of Permeability, Porosity, & Residual Water Saturation Relationships for Sandstone Reservoirs", THE LOG ANALYSTS, pp 8-17, July-August, 1968. One such method, for example, is to correlate irreducible water saturations, surface areas or both measured from rock samples to a formation shaliness factor determined from conventional Spontaneous Potential, gamma ray or density and velocity logs, as is described by Murphy and Owens in "A New Approach for Low-Resistivity Sand Log Analysis", JOUR. OF PETROLEUM TECH., pp 1302-1306, November 1972.

Some methods dispense with the gathering of formation samples altogether. One is to correlate log-determined fractional water saturations and porosities, as is described at page 104 of a booklet entitled LOG INTERPRETATION Volume I-Principles (1972 ed.), published by Schlumberger Ltd., New York, N.Y. Methods used to determine fractional water saturation and porosity are described elsewhere in the volume which with its contained references is incorporated by reference herein.

Another suggested method which does not require the obtaining of core samples is to measure the free fluid in the formation pore space using a nuclear magnetic resonance tool, such as the nuclear magnetic log manufactured by the aforesaid Schlumberger Ltd. It is assumed in this last method that the remainder of the formation porosity is occupied by bound (i.e. irreducible) fluid, essentially or entirely water.

Each of these methods is multiple stepped in that it requires a resistivity or other log be taken to determine the formation water saturation and one or more additional logs be taken and/or core samples obtained and analyzed before an attempt can be made to identify potential low resistivity pay sands. These multiple step approaches are expensive and time consuming. Furthermore, the last method requires a special logging tool, the nuclear magnetic resonance log, which is not yet commonly used or widely available and may additionally require special treatment of the bore hole mud, adding to exploration expense and effectively restricting its use to those bore holes which were properly preconditioned. Apart from these drawbacks of the presently used methods, it is desirable to have several quick and inexpensive methods to identify potential low resistivity pay sands which may be compared with one another to increase the confidence in identifying such formation zones.

OBJECTS OF THE INVENTION

It is an object of the invention to provide a new method for identifying potential pay sands using conventional log data.

It is yet another object of the invention to provide a method identifying potential pay sands by their specific surface areas.

SUMMARY OF THE INVENTION

The above and other objects are satisfied by the invention which is a method for identifying potential low resistivity pay sands by determining the specific surface area of formation material along at least a portion of the thickness of a sand formation and identifying those zones of the portion in which the specific area is sufficiently large as to bind all or substantially all of any water present in such zones. Any hydrocarbons located in such zones, if the zones are permeable to the hydrocarbon, will be produced water-free or essentially water-free if the zone is tapped. In particular, it has been found that if the specific surface area of the sand formation material approximates or exceeds 500 m$^2$/cm$^3$ bulk volume, all or all but an acceptable portion of the water in the material will be bound. This figure can also be represented in terms of specific surface area per unit solid material and specific surface area per unit pore space.

According to an important feature of the invention, a logging tool traverses a borehole through the formation to determine the permeability and porosity of at least a portion of the formation. The specific surface area of the portion is determined from the porosity and permeability values. The specific surface area values are used to identify those zones in which hydrocarbons will be produced with substantially no water production.

According to yet another important feature of the invention, data may be gathered to identify specific surface areas in a single logging step. The portion of the formation being investigated is logged by traversing a borehole through that portion of the formation with an acoustic logging tool having means for generating pulses of acoustic energy as it traverses the borehole. Reflected and/or refracted returns of the pulsed acoustic energy are detected by one or more receivers associated with the tool which also generate signals representing the acoustic energy being detected. Permeability of the formation may be determined from such signals generated by an acoustic logging tool which can detect the low frequency boundary waves known as tube waves as well as the compression, shear, and mud waves conventionally detected by acoustic logs. The signals generated by the acoustic log may also be used to determine the porosity of the formation according to standard formulas. Alternatively, the portion of the formation being investigated can be logged with another porosity indicating tool.

According to another important feature of the invention, the determined specific surface areas ar plotted versus depth in order to aid in the identification of those zones where the surface areas are sufficiently large.

According to yet another important feature of the invention, irreducible water saturation of the formation is determined from specific surface area and is compared with the fractional water saturation of the formation normally determined from conventional well logs. Low water cut hydrocarbons are potentially found in those regions where the irreducible water saturations approximate or exceed the fractional water saturations.

DETAILED DESCRIPTION OF THE INVENTION

According to the invention, potential low-water cut or essentially water-free hydrocarbon producing (i.e. "pay") zones of a low resistivity sand formation, which may be consolidated, unconsolidated or of some intermediate condition, can be identified from the specific surface areas of the formation material. Generally in such sand formations, those zones having relatively large specific surface areas and in particular zones having bulk volume specific surface areas greater than about 500 m$^2$/cm$^3$ are most likely to have bound or essentially bound water saturations. It will be appreciated that these values may be converted into pore space and solid material specific surface areas for the practice of the invention. Furthermore, the specific surface areas are determined from the formation porosity and permeability, which values are preferably obtained by logging the formation.

Figure 1:
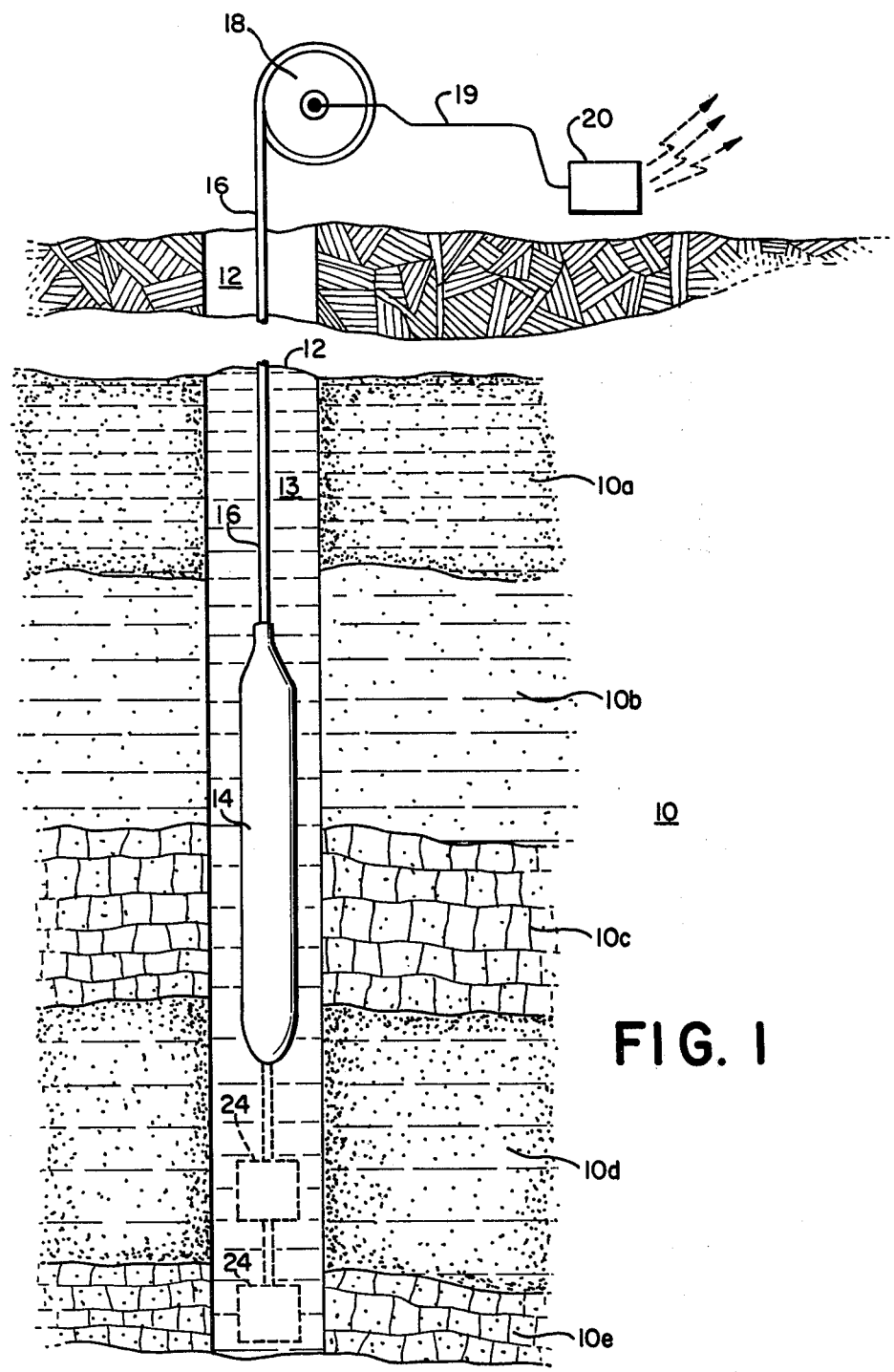
FIG. 1 is a schematic diagram of the logging of a sandstone formation.

FIG. 1 depicts in an exemplary fashion the logging of a typical sand formation 10 being investigated for low resistivity pay reservoirs. After a borehole 12 had been dropped into the formation 10, comprising a plurality of zones 10a–10e, a logging tool 14 is typically lowered and then raised by means of a cable 16 and appropriate surface equipment 18 through the formation to measure (i.e. log) one or more of its characteristics. Signals generated by appropriate components in the tool 14 are transmitted through the cable 16 to surface equipment 20 for processing, recording and/or transmission to a distant site for processing and/or recording. Zones 10a and 10d have essentially bound water saturations and free hydrocarbons; zone 10b contains free water; zone 10c has an exceptionally low porosity; and zone 10e is essentially impermeable having trapped water, hydrocarbons or both. Typically the borehole is filled with mud 13.

The permeability of the sandstone formation 10 is determined, preferably by logging and preferably in the manner and with the apparatus described in a pending application Ser. No. 222,102 filed Jan. 2, 1981, assigned to assignee hereof and fully incorporated by reference herein. According to that invention, formation permeability is determined by means of a long-spaced acoustic logging tool comprising a transmitter 14 (See FIG. 1) outputting pulses of low frequency acoustic energy (sonic waves) at intervals while traversing a borehole and one or more wideband acoustic receivers 24 (See FIG. 1), preferably having a response at least between about 0.1k Hz and 30k Hz and positioned at known, specified lengths (preferably at least five feet) from the transmitter 14. The receivers 24 detect the various types of reflected and/or refracted waves generated by the transmitted low frequency acoustic energy including compression, shear, mud and, most importantly, tube waves.

Permeability is inversely proportional to the amplitude of the tube waves detected by each receiver 24 as well as to the ratio of amplitude detected by a pair of receivers 24. Absolute permeability may be determined from the tube wave amplitudes by correlating detected tube wave amplitudes with respect to known permeabilities. This may be done by taking at least one and preferably two side wall cores at known locations in a borehole, measuring the permeabilities of these cores in a laboratory using conventional techniques and correlating the tube wave amplitudes obtained in the vicinity of each core with the laboratory measured permeability of the same materials. Alternatively, the acoustic logging tool may be calibrated by running it through a thick formation of known, uniform permeability and correlating the recorded amplitude of the tube waves resulting therefrom with the known permeability. Once calibrated, the apparatus may be used at other locations to determine absolute permeabilities. However, improved accuracy can be achieved by recalibrating the apparatus each time it is used in a different area having a new lithology.

Porosity of the formation may be determined from the same acoustic log used to determine permeability. See, for example, a description of this practice in *LOG INTERPRETATION* Volume I-Principles, pp. 37–41 Schlumberger Ltd., New York, N.Y. (1972 edit.). Alternatively, porosity may be determined by logging the formation with another conventional porosity indicating tool such as a formation density, gamma ray or neutron log, the operation of which are well known and described, for example, in the aforesaid Schlumberger reference.

After the formation permeability and porosity have been determined from the acoustic log or by other methods, the bulk volume specific surface area of the formation material, S, is determined by means of the Kozeny equation:

$$S = (\phi^3/kK)^{\frac{1}{2}} \qquad (1)$$

where K is permeability in e.g.s. units/cm², $\phi$ is the fractional porosity of the formation and k is the Kozeny constant which has been empirically determined for various types of lithologies. For sand, a typical value for k is 5.0. The Timur article referred to in the Background of the Invention section above and P.C. Carman, *Flow of Gases Through Porous Media*, Academic Press Inc. New York (1956) provide a more extensive discussion of the Kozeny equation and constant and are incorporated by reference.

Preferably, it is envisioned that the specific surface areas, S, will be determined by means of a suitably programmed general purpose digital computer which can be further programmed to generate a log of the surface areas of the sandstone formation versus depth which can be displayed or to list or otherwise identify those depths, with or without an indication of their determined specific surface areas, which exceed the minimum specific surface area 500 m²/cm³.

Figure 2:
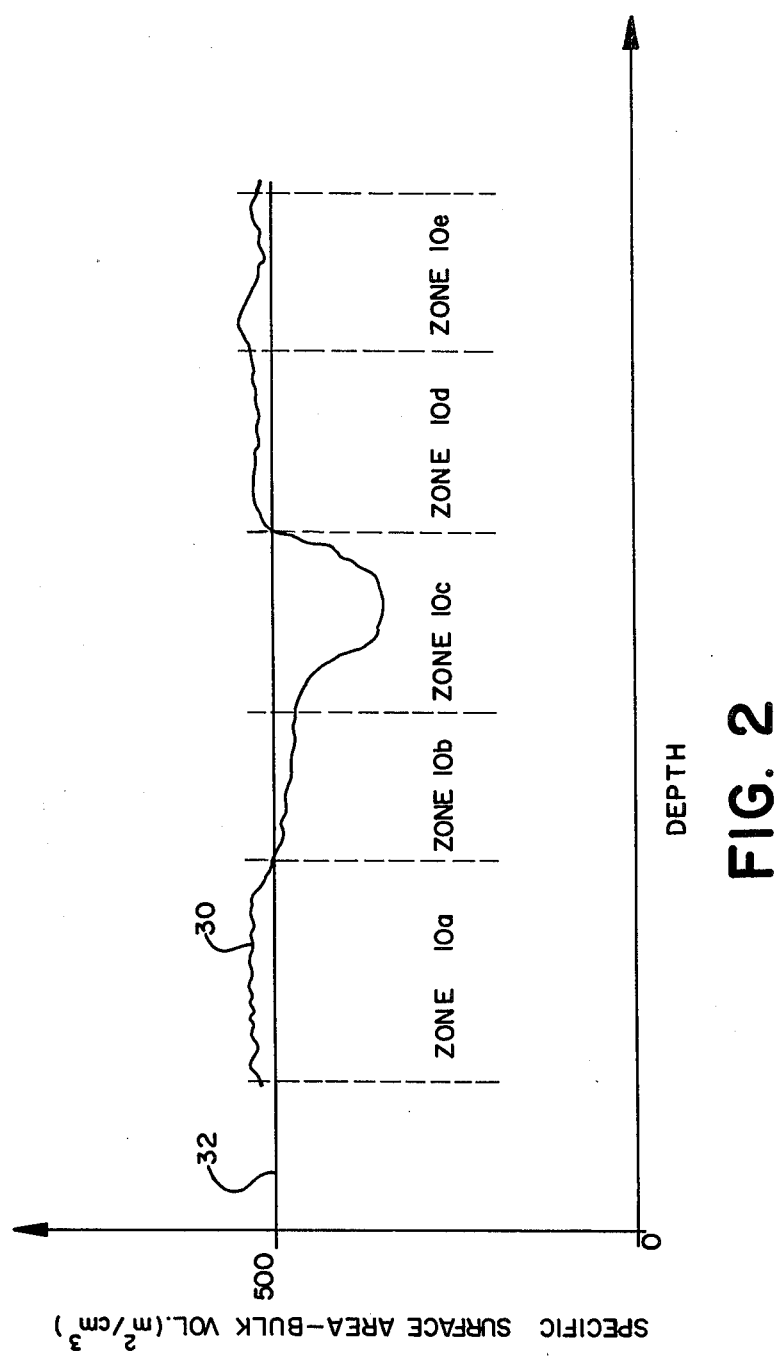
FIG. 2 is a plot of surface area versus depth illustrating the locating of the potential low water cut hydrocarbon producing zones.

FIG. 2, for example, is a plot of specific surface area(s) indicated by varying line 30, for the portion of the formation 10 of FIG. 1. The zones 10a and 10d have specific surface areas about or exceeding 500 m²/cm³ bulk volume, indicated by the line 32, identifying them as potential low-water cut pay sands. Zone 10b has specific surface area less then the minimum identifying it as a probable water producing zone. Zone 10c has a low porosity and as a result displays a relatively low specific surface area. Zone 10e has a specific surface area exceeding 500 m²/cm³ but it is caused by very low formation permeability [Zde relationship (1), above defining S] so that although any water in that zone is bound it may not be possible to draw off the hydrocarbons which are present.

An alternative and perhaps more useful method of identifying the potential low water cut hydrocarbon zones is to determine the irreducible water saturations of the formation from its specific surface area S and to compare them to the fractional water saturation of the formation typically determined from conventional logs, as is described in a pending application Ser. No. 336,743 filed Jan. 4, 1982, entitled "Method of Locating Potential Low Water Cut Hydrocarbon Reservoirs", assigned to the assignee of this application and fully incorporated by reference herein. Fractional water saturation is determined in a conventional fashion, typically by logging the formation through the borehole with an appropriate formation resistivity logging tool and determining formation water saturation from said resistivity measurements using the well-known Archie relation. Irreducible water saturation is determined from the specific surface area of the formation material by the relationship:

$$S_{wirr} = 1 - 10^{[-0.00329A \cdot C_o]} \qquad (2)$$

where "$S_{wirr}$" is the irreducible water saturation of the formation (expressed as a fraction of pore space), "A" is the bulk volume specific surface area of the formation material in m²/cm³ and $C_o$ is a constant which has been found equal to 0.00435 for Pleistocene sands in the Gulf of Mexico near the Louisana coast. As is described in the aforesaid application Ser. No. 336,743, $C_o$ may vary somewhat from site to site and if desired, a more accurate value for $C_o$ may be obtained for a particular formation by measuring the bulk volume specific surface area of a formation sample obtained from a no water cut zone of known water saturation, preferably using nuclear magnetic resonance techniques as is described in the aforesaid application Ser. No. 336,743, and solving the relationship (2) for $C_o$.

Figure 3:
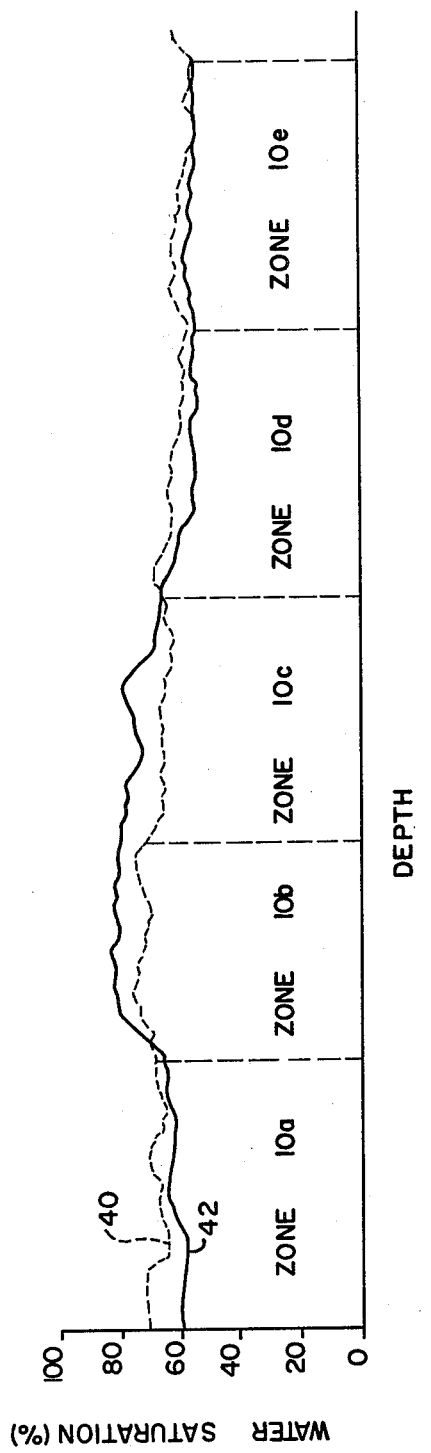
FIG. 3 is a plot of irreducible water saturation and fractional water saturation versus depth illustrating an alternative method of locating the potential low water cut hydrocarbon producing zones.

FIG. 3 is a plot in well log format of irreducible water saturation, indicated by the broken line 40, and fractional water saturation, indicated by the solid line 42, as a function of depth for the formation 10 of FIG. 1. Again the irreducible water saturation 40 is determined from the formation specific surface areas using the relationship (2), above while the fractional water saturation 42 is determined a formation resistivity log using the well-known Archie relationship as is described in the aforesaid Schlumberger volume, or from other logs by other techniques. Those zones of the formation where the irreducible water saturation approximates or exceeds the formation water saturation (i.e. those marked 10a, 10d and 10e) are potential low water cut hydrocarbon producing zones.

Having described specific embodiments of the present invention it will be understood that further modifications throughout may be suggested to those skilled in the art, and it is intended to cover all subject modifications as fall within the scope of the appended claims.

What is claimed:

1. A method of locating potential low water cut hydrocarbon producing regions of a sand formation comprising the steps of:

traversing a length of a borehole extending into said formation with a logging tool to produce an indication of permeability of the formation along said length;

traversing said length of the borehole with a logging tool to produce an indication of porosity of the formation along said length;

determining specific surface area values of the formation from the indicated permeability and porosity; and producing a log of said specific surface area values to identify zones along said length wherein the specific surface area of the formation sand is sufficiently large to bind all or substantially all of any water present in such zones as potential low water cut hydrocarbon producing regions.

2. The method recited in claim 1 wherein the step of producing a log further further includes the step of plotting specific surface area as a function of depth.

3. The method of claim 1 further comprising the step of identifying from said log those zones in which said specific surface area equals or exceeds about 500 m$^2$/cm$^3$ bulk volume as potential low water cut hydrocarbon producing regions.

4. The method of claim 3 further comprising before said identifying step, the step of plotting the specific surface area of said log with depth and said identifying step further comprises identifying said zones from said plot.

5. The method recited in claim 1 wherein the step of traversing the borehole to produce an indication of permeability is performed with an acoustic logging tool and further comprises the steps of:
  pulsing a transmission means of said logging tool to generate acoustic energy at intervals during said traversing step;
  detecting during said traversing step with a first receiver of said logging tool, the returns of said transmitted acoustic energy including the tube wave returns; and
  wherein the recited method further includes the step of determining permeability values from the amplitude of said detected tube wave returns.

6. The method of claim 5 wherein the step of traversing the borehole to produce an indication of permeability further comprises the step of detecting with a second receiver of said logging tool said tube wave returns and wherein said step of determining permeability further comprises determining permeability from the ratios of the amplitude of the tube wave returns detected by the first receiver and the amplitude of the tube wave returns detected by the second receiver.

7. The method of claim 5 wherein the two traversing steps are performed as a single step and said indication of porosity is produced by said detected returns.

8. The method of claim 1 further comprising the steps of:
  traversing said length of the borehole with a logging tool to produce an indication of fractional water saturation of the formation with depth;
  producing a second log of irreducible water saturation values and fractional water saturation values along said length of the formation from said specific surface area log and said indication of water saturation;
  comparing said irreducible water saturation values and fractional water saturation values of said second log; and
  identifying as a result of said comparing step zones along said length of the formation in which the irreducible water saturation values approximate or exceed the fractional water saturation values.

9. A method of locating potential low water cut hydrocarbon producing regions of a sand formation comprising the steps of:
  traversing a length of a borehole into said formation with a logging tool to produce an indication of permeability of the formation along said length;
  traversing said length of the borehole with a logging tool to produce an indication of porosity of the formation along said length;
  traversing said length of the borehole with a logging tool to produce an indication of fractional water saturation of the formation along said length;
  determining specific surface area values of the formation along said length from the indications of permeability and porosity;
  determining irreducible water saturation values along said length of the formation from said specific surface area values;
  determining fractional water saturation values along said length from the said indication of fractional water saturation;
  comparing said irreducible water saturation values and fractional water saturation values along said length; and
  identifying as a result of said comparing step zones along said length in which the irreducible water saturation values approximate or exceed the fractional water saturation values.

10. The method of claim 8 or 9 further comprising before said step of comparing the additional step of displaying together said irreducible water values and fractional water saturation values as a function of depth and wherein said comparing step further comprises comparing the displayed irreducible water saturation values and fractional water saturation values.

11. A method of locating potential low water cut hydrocarbon producing regions of a sand formation comprising the steps of:
  producing a first log containing permeability values for the formation along the length of a borehole extending into the formation;
  producing a second log containing porosity values for the formation along said length;
  producing a third log of specific surface area values of the formation along said length from said first and second log; and
  identifying potential low water cut hydrocarbon producing regions along said length of the formation using said third log.

12. The method of claim 11 further comprising the steps of:
  displaying the specific surface area values of said log; and
  identifying as a result of said displaying step zones along said length wherein the specific surface area of the formation material approximates or exceeds 500 m$^2$/cm$^3$ bulk volume.

13. The method of claim 11 further comprising the steps of:
  producing a fourth log containing irreducible water saturation values for the formation material along said length from said third log; and
  identifying said potential low water cut hydrocarbon producing regions from said fourth log.

* * * * *